United States Patent Office 3,228,982
Patented Jan. 11, 1966

3,228,982
TETRAAMINODIPHENYL ETHER COMPOUNDS
Robert M. Washburn and Franklin A. Billig, Whittier, Calif., assignors to American Potash & Chemical Corporation, Los Angeles, Calif., a corporation of Delaware
No Drawing. Filed Apr. 30, 1962, Ser. No. 191,273
8 Claims. (Cl. 260—558)

This invention relates, in general, to novel aminodiphenyl ether compounds and to novel methods for the preparation of these compounds. More specifically, this invention relates to polyaminodiphenyl ethers and derivatives thereof; and to processes for their preparation.

Polyaminodiphenyl ethers and their derivatives are useful intermediates in the preparation of polymeric borimidazoles having improved physical properties as is more specifically defined in our co-pending application, Serial Number 148,727, filed October 30, 1961. These amino substituted diphenyl ethers and their derivatives are also useful as intermediates in the synthesis of dyes; for example, 3,3'4,4'-tetraaminodiphenyl ether reacts with phenyldiazonium salts to produce dyes. The polyaminodiphenyl ether compounds are also useful as curing agents for epoxy formulations and in amine-epoxy-phenolic compositions.

Broadly, the aminodiphenyl ether compounds according to this invention, contain two or more amino substituents or derivatives thereof, adjacent to one another on each of the phenyl rings in the diphenyl ether.

More specifically, the aminodiphenyl ethers and derivatives thereof, according to this invention, have the formula:

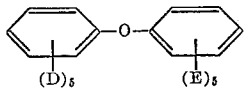

wherein each D substituent and each E substituent for each position on the phenyl rings are independently chosen from the following substituents: hydrogen, amino, ammonium salt, acylamino and lower alkyl.

This selection of the substituents is made with the provision that at least two of the D substituents are adjacent amino, acylamino, or ammonium salt substituents and two of the E substituents are adjacent amino, acylamino, or ammonium salt substituents. Thus, on each phenyl ring there will always be at least two substituents selected from the group consisting of amino, acylamino or ammonium salt positioned adjacent to one another.

Preferred aminodiphenyl ether compounds are the tetraamino-, tetraacylamino-, and the tetraamonium salt diphenyl ether compounds. The tetra-substituted compounds are particularly useful in the preparation of polymers.

Broadly, the polyaminodiphenyl ether compounds of this invention are prepared by the steps of acylating, nitrating, hydrogenating and hydrolyzing a diaminodiphenyl ether and recovering the tetraaminodiphenyl ether compound. The steps of reduction (hydrogenation) and hydrolysis can be performed in any sequence desired, however, the preferred procedure is hydrolysis, followed by hydrogenation. If the acylamino derivative is to be produced, an additional acylation step must be performed. If the ammonium salt is to be produced, an acidification step must be added. The sequence of reactions can be repeated to provide additional substituents on the phenyl rings so long as there are hydrogen atoms on the phenyl rings which can be replaced by additional substituents.

More specifically, the polyaminodiphenyl either compounds are prepared from a diaminodiphenyl ether as shown in the following specific exemplary reaction sequences.

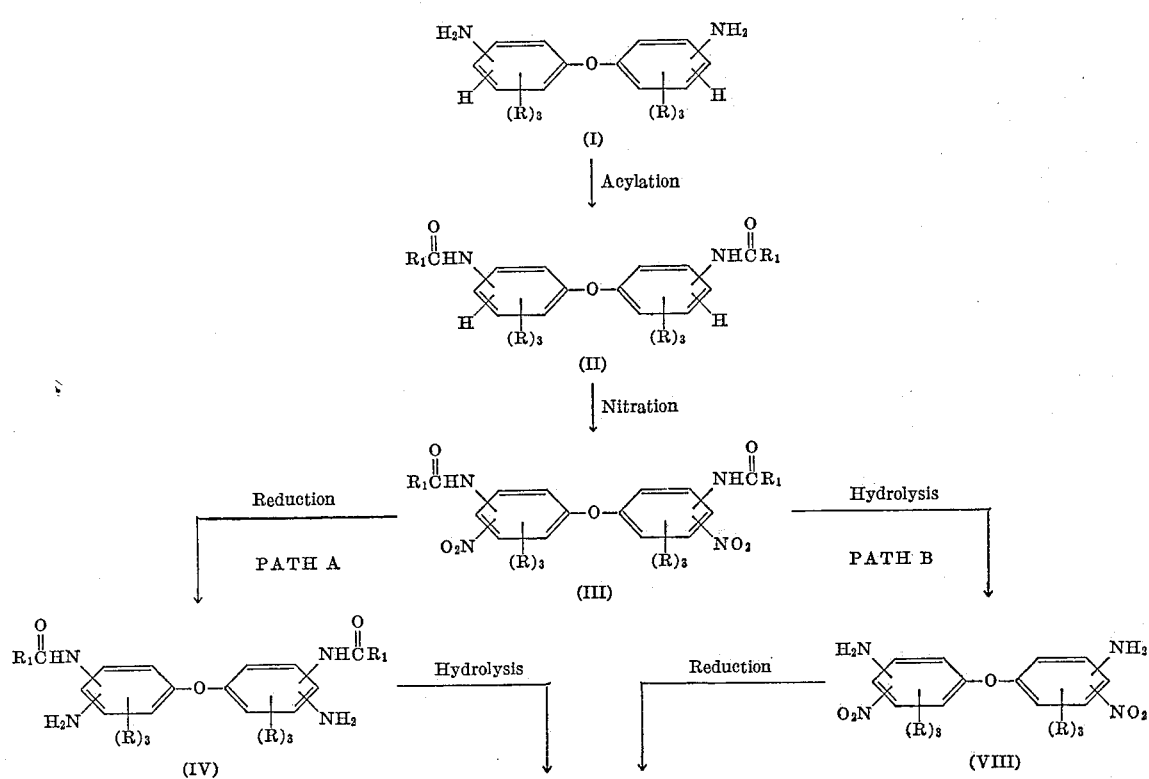

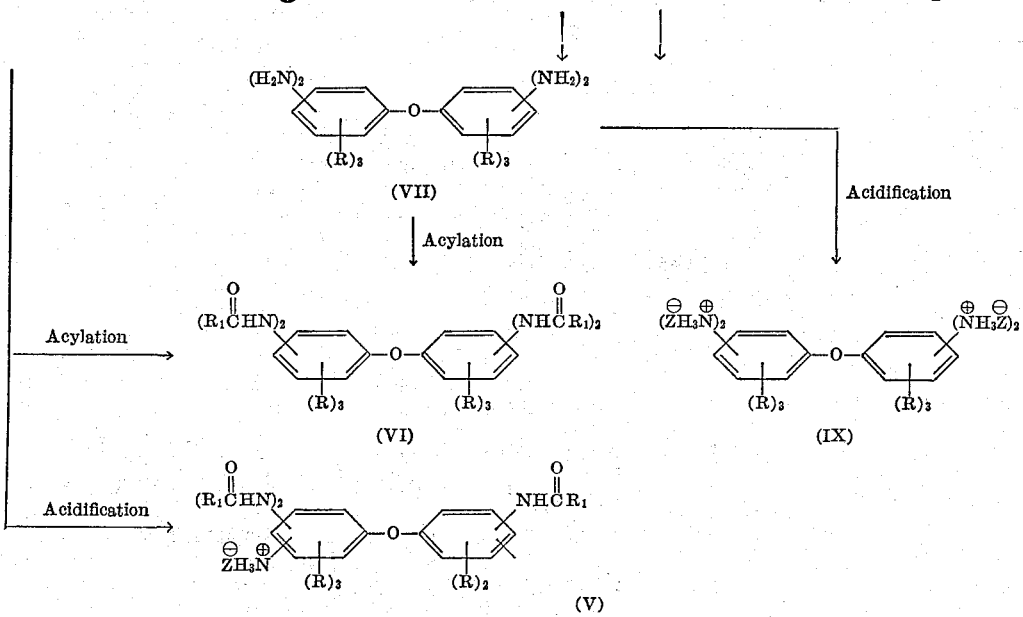

(VII)

Acylation

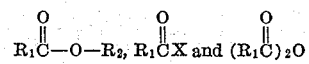

(VI)

Acidification (V)

Acidification (IX)

In the above formulas, R can be either hydrogen or lower alkyl. The nature of $R_1$ is not critical since it does not enter into the reaction. For this reason, $R_1$ can be any inert organic radical, however, it is generally an alkyl or aryl substituent. $z$ is an acid salt radical and can be any of sulfate, halide, phosphate, fluoborate, perchlorate and the like radicals.

The following description is not to be construed as being limited to the specific reaction sequences set forth above. Throughout the following description, reference is made to the above reaction sequences for the purpose of exemplification and not for the purpose of limiting the description.

The first step in the process involves acylation of a diaminodiphenyl ether (I). The acylating agent can be an acid, acid chloride, acid anhydride or acid ester. These acylating agents have the general formulas:

$$R_1\overset{O}{\overset{\|}{C}}-O-R_2,\ R_1\overset{O}{\overset{\|}{C}}X\ \text{and}\ (R_1\overset{O}{\overset{\|}{C}})_2O$$

In these formulas, $R_1$ is as defined above and $R_2$ can be any inert organic radical but is generally an alkyl or aryl substituent. For example, suitable acylating agents include acetic acid, propanoic acid, butanoic acid, benzoic acid, acetyl chloride, propanoyl chloride, butanoyl chloride, benzoyl chloride, acetic anhydride, 2-ethyl hexanoic anhydride, benzoic anhydride, ethylacetate, propyl acetate, butylacetate, ethyl benzoate, and the like.

The resulting acylated compound (II) is nitrated to yield (III). Although, a variety of nitrating media can be used such as nitric acid/sulfuric acid; alkali metal nitrate/acetic acid; $BF_3:N_2O_4$, and the like, the preferred nitrating agents are acyl nitrates. Acyl nitrates provide the highest yield of the desired nitrated product. These acyl nitrates have the formula

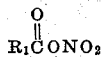

$R_1CONO_2$ wherein $R_1$ is as defined above.

Generally, the nitration temperatures when acyl nitrates are used, are held below 25° C. to prevent decomposition of the acyl nitrate. Reaction temperatures from about −25 to +25° C. can be used, but temperatures of 0° to about 15° C. are preferred because the acyl nitrates are stable at this temperature and the reaction proceeds smoothly and rapidly.

The nitrated acylaminodiphenyl ether (III) can be caused to react according to Path A or Path B as shown. According to Path A, reduction yields the aminoacylaminodiphenyl ether (IV).

Reduction of (III) can be accomplished chemically or catalytically; for example, suitable chemical reduction systems include iron and hydrochloric acid, tin and hydrochloric acid, zinc and hydrochloric acid and the like; suitable catalysts for catalytic reduction of (III) include Raney nickel, Adam's catalyst, rhodium catalysts, and the like. Suitable solvents for catalytic reduction are aliphatic and aromatic alcohols, ethers, acetic acid, water and the like.

Reaction temperatures for reduction can vary from about room temperature to about 100° C., and at pressures from atmospheric to several thousand pounds. These variables are not critical; in general, faster rates of reaction can be obtained at higher temperatures and pressures.

The aminoacylaminodiphenyl ether (IV) when acidified, yields a diphenyl ether (V) having an ammonium salt function adjacent to an acylamino function. Suitable acids are hydrochloric acid, hydrobromic acid, hydriodic acid, sulfuric acid, phosphoric acid, fluoboric acid, perchloric acid and the like.

Acylation of (IV) with an acylating agent, yields a diphenyl ether (VI) having four acylamino groups, wherein there are two adjacent acylamino groups on each of the phenyl rings.

Hydrolysis of (IV) yields some tetraaminodiphenyl ether (VII), wherein there are two adjacent amino groups on each of the phenyl rings.

Reaction Path B, involves hydrolysis of the nitroacylaminodiphenyl ether (III) to yield a dinitrodiaminodiphenyl ether (VIII) wherein there is a nitro group adjacent to an amino group on each of the phenyl rings. Suitable conditions and reagents for the hydrolysis are aqueous bases or alcoholic bases at temperatures from about room temperature to the boiling point of the solvent. If room temperatures are used, longer reaction times are required. Generally, alcoholic potassium hydroxide at the boiling point, provides excellent yields of product (VIII).

The reduction of (VIII) as described above for the reduction of (III), provides an excellent yield of a tetraaminodiphenyl ether (VII) having two adjacent amino groups on each of the phenyl rings.

Acylation of (VII) yields a tetraacylaminodiphenyl ether (VI) having two adjacent acylamino groups on each phenyl ring.

Acidification of (VII) yields a diphenyl ether (IX) having four ammonium salt functions wherein there are two adjacent ammonium salt functions on each phenyl ring.

The preferred method for the production of polyaminodiphenyl ether is that wherein the polynitro polyacylamino such as the compound (III) is first hydrolyzed and then reduced (hydrogenated) to produce the polyaminodiphenyl ether. Path B is exemplary of the preferred method. This preferred method provides a very high yield of the polyaminodiphenyl ether, generally over 80%, based on the aminodiphenyl ether starting material. Yields obtained by the alternative procedure of reduction followed by hydrolysis, exemplified by Path A, are usually much lower than those obtained by the preferred method.

The acidified product (IX) can be hydrolyzed to the tetraamino compound (VII). The acylated product (VI) can also be hydrolyzed to produce the tetraamino compound (VII). A higher yield of tetraamino compound (VII) is obtained from Path A, by acylating (IV) to produce (VI) and then hydrolyzing (VI) to produce (VII), instead of hydrolyzing (IV) directly to produce (VII).

The above sequence of steps can be performed either in a batch or continuous operation.

The tetraaminodiphenyl ether product which is recovered from this reaction can be isolated from the reaction medium or not, as desired. If no reaction medium is employed, the tetraaminodiphenyl ether compounds will be recovered in an isolated state.

Acylating agents which contain a plurality of carbonyl groups can be attached to the amino substituents so as to form diacylamino compounds in a plurality of ways. Thus, bivalent dicarbonyl substituents may be attached to two amino substituents in a single diphenyl ether molecule or the bivalent dicarbonyl substituents may bridge and join together one or more molecules of diphenyl ether.

Generally, the tetraaminodiphenyl ethers prepared according to this invention become colored in the presence of air and/or light indicating slight decomposition. This decomposition is not extensive enough to be of any importance.

The ammonium salts and acylamino compounds derived from the tetraaminodiphenyl ethers of this invention appear to have excellent stability on exposure to light and air. For example, the salts and acylated derivatives can be handled in the air without evidence of decomposition or discoloration. For this reason, these compounds are generally stored and handled as the acylamino or ammonium derivatives.

If it is desired to use the tetraaminodiphenyl ether as a chemical intermediate, it is generally preferable to protect the amino groups by acidification or acylation. The amino groups which are thus protected are relatively inert to further reaction. For example, nitric acid causes the partial destruction of tetraaminodiphenyl ether, but tetraacylaminodiphenyl ethers can be nitrated readily without reaction with the acylamino groups. Such a procedure provides a basis for the introduction of a variety of substituents such as additional amino groups and cyano, halo or azo groups and the like, as is exemplified generally by the specific reaction scheme shown below:

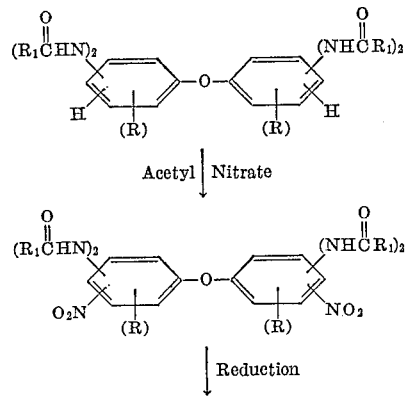

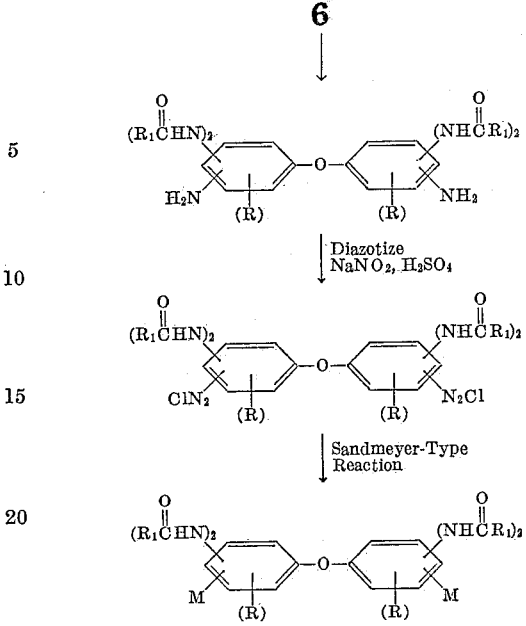

In these structural formulas, R and $R_1$ have the same meanings as above. The substituent M can be any of CN, Cl, Br, I or the like.

In general, the tetraaminodiphenyl ether compounds of this invention will undergo those reactions which are characteristic of amino compounds with the additional feature imposed by these ortho-positioned amino substituents. Characteristically, substitution of the phenyl substituents takes place adjacent to one of the amino substituents due to the directive influence of these adjacently positioned amino substituents. These characteristics render the compounds of this invention particularly valuable in the preparation of polymers and as dye intermediates.

The process of this invention is of particular significance because it provides a preferred reaction scheme, whereby a high overall yield is obtained even though several reaction steps are necessary. The process of this invention also provides flexibility as to the end product, i.e., amino, acylamino or ammonium salt without disturbing the basic steps of the process. The sequence in which the steps of this process are performed is critical even though certain of the individual steps are conventional.

In the specification, claims, and following examples, all parts and percentages are by weight unless otherwise specified. The following examples are submitted to illustrate even more clearly the invention and are not to be construed as limiting the invention.

Example I is illustrative of the acylation step of this invention.

*Example I*

4,4'-diaminodiphenyl ether (7.95 g., 0.0398 mole) is heated on a steam bath for 30 minutes with 100 ml. of a 1:1 mixture of acetic anhydride-acetic acid. The reaction mixture is poured onto ice. The solids are removed by filtration, washed with water and recrystallized from acetic acid to give 11.3 g., (0.0398 mole, 100%) of 4,4'-diacetylaminodiphenyl ether, M.P. 225–227° C.

Example II is illustrative of the nitration step of this invention.

*Example II*

A 5.0 g. (0.018 mole) quantity of 4,4'-diacetylaminodiphenyl ether is added to acetyl nitrate, prepared from 6.75 g. of 70% nitric acid and 43.5 g. (40 ml.) acetic anhydride. The reaction mixture is stirred at 10–15° C. for 30 minutes after the addition and then poured into ice water. The resulting solids are removed by filtration, washed with ice water and then with petroleum ether, and air dried to give 6.0 g. (0.016 mole, 89%) of 3,3'-dinitro-4,4'-diacetylaminodiphenyl ether. This ether is obtained as yellow needles, M.P. 200–202° C., after crystallization from acetic acid and then from ethanol. Treatment with acetic anhydride, then crystallization from ethanol and finally, recrystallization from ethyl acetate raises the melting point of this ether to 215–215.5° C.

Example III is illustrative of the hydrogenation (reduction) of a dinitrodiacylamino compound according to this invention to produce a diaminodiacylamino compound.

*Example III*

In an experiment, 2.0 g. (0.0053 mole) of 3,3'-dinitro-4,4'-diacetylaminodiphenyl ether is reduced at 60 lbs. hydrogen pressure over Raney nickel in ethanol to give 1.5 g. (0.0048 mole, 91%) 3,3'-diamino-4,4'-diacetylaminodiphenyl ether as white plates from ethanol, M.P. 213–214° C.

In a similar manner, 75 g. (0.20 mole) of 3,3'-dinitro-4,4'-diacetylaminodiphenyl ether is reduced in an autoclave at 200 lbs. hydrogen pressure to give 52.7 g. (0.17 mole, 84%) of the amine, M.P. 213–213.5° C., from ethanol.

Example IV is generally illustrative of the hydrolysis of a diacylaminodiamino compound according to this invention, to produce a tetraaminodiphenyl ether.

*Example IV*

Approximately 5 g. of 3,3'-diamino-4,4'-diacetylaminodiphenyl ether is placed in 33 ml. ethanol and a solution of 3 g. potassium hydroxide in 25 ml. water added and the solution is boiled 3 minutes. The solids obtained on cooling and filtering are shown by infrared analysis to be mainly starting material with traces of 3,3',4,4'-tetraaminodiphenyl ether.

Example V is illustrative of the hydrolysis of a dinitrodiacylamino compound according to this invention, to produce a dinitrodiamino compound.

*Example V*

A solution of 3,3'-dinitro-4,4'-diacetylaminodiphenyl ether (3.3 g., 0.0088 mole) in 53 ml. ethanol is treated with 1.02 g. (0.0182 mole) potassium hydroxide in 25 ml. distilled water and heated on a steam bath until a clear red solution is obtained (5 min.). The solution is cooled and 1.8 g. of a red crystalline solid is removed by filtration, M.P. 176–177° C. Recrystallization from ethyl acetate gives 1.6 g. (0.0055 mole, 62.5%) of 3,3'-dinitro-4,4'-diaminodiphenyl ether, a red, microcrystalline powder, M.P. 178.5–179° C.

A further 0.4 g. (0.0011 mole, 12.2%) of product is obtained by filtration of the partially evaporated ethanolic filtrate and recrystallization from ethyl acetate, M.P. 178–179 C.

Example VI is illustrative of the hydrogenation (reduction) of a dinitrodiamino compound to produce tetraaminodiphenyl ether which is subsequently converted to the tetrahydrochloride compound according to this invention.

*Example VI*

3,3'-dinitro-4,4'-diaminodiphenyl ether (2.0 g., 0.0069 mole) dissolved in 200 ml. ethanol is reduced over Raney nickel at 37 lbs. hydrogen pressure. The catalyst is removed by filtration and the solvent removed by evaporation. The resulting crude solid (1.4 g., 0.0060 mole, 88%) is recrystallized from ethanol and from ethyl acetate in an argon atmosphere, M.P. 120–122° C. The product, 3,3',4,4'-tetraaminodiphenyl ether, is colorless when first prepared but turns dark within a few minutes when exposed to light. The product is converted to the tetrahydrochloride by treatment with HCl.

Example VII is illustrative of the acylation of diaminodiacylamino compounds to produce the tetraacylamino compound according to this invention.

*Example VII*

Approximately 0.25 g. (0.00080 mole) 3,3'-diamino-4,4'-diacetylaminodiphenyl ether is acetylated by warming with 20 ml. acetic anhydride on a steam bath to give 0.1 g. (0.00026 mole, 32%) of 3,3',4,4'-tetraacetylaminodiphenyl ether. This is obtained as a white powder, M.P. 222–226° C., after washing with water and recrystallization from acetic acid.

Example VIII is illustrative of the preparation of an ammonium salt according to this invention.

*Example VIII*

3,3',4,4'-tetraaminodiphenyl ether (0.5 g., 0.0022 mole) previously recrystallized from ethyl acetate, is treated with a slight excess of concentrated hydrochloric acid to give 0.78 g. of bright purple 3,3',4,4'-tetraammoniumhydrochloridediphenyl ether crystals, vacuum dried 100° C./0.05 mm. for 8 hours.

*Example IX*

The procedures of Examples I, II, V and VI, above, are carried out in that sequence, using appropriate reagents to produce the following polyaminodiphenyl ethers: 3,4,2',3'-tetraaminodiphenyl ether; 2,2',3,3'-tetraaminodiphenyl ether; 2,2'-dimethyl-3,3',4,4'-tetraaminodiphenyl ether; 2,2'-diisoamyl-3,3',4,4'-tetraaminodiphenyl ether; 5,5'-dinonyl-3,3',4,4'-tetraaminodiphenyl ether and 2,2',-3,3',4,4'-hexaaminodiphenyl ether.

Example X exemplifies the acylation of a polyaminodiphenyl ether.

*Example X*

3,3',4,4'-tetraaminodiphenyl ether is acylated according to the procedure set forth in Example I, above, to product a quantitative yield of 3,3',4,4'-tetraacetylaminodiphenyl ether.

Example XI is illustrative of the acidification of diaminodiacylamino compounds to produce diammonium salt diacylamino compounds.

*Example XI*

3,3'-diamino-4,4'-diacetylaminodiphenyl ether is acidified according to the procedure of Example VIII, above, produce 3,3'-diammoniumhydrochloride - 4,4' - diacetylaminodiphenyl ether.

Example XII is exemplary of the hydrolysis of a polyacylamino compound to produce a polyamino compound.

*Example XII*

3,3',4,4'-tetraacetylaminodiphenyl ether is subjected to hydrolysis according to the procedure of Example V, above, to produce 3,3',4,4'-tetraaminodiphenyl ether.

*Example XIII*

The procedures of Examples I, II, V, VI and X, above, are carried out in that sequence, using appropriate reagents, to produce the following polyacylaminodiphenyl ethers: 3,3',4,4'-tetrabenzoylaminodiphenyl ether; 3,3',4,4'-tetrabutyroylaminodiphenyl ether; 2,3,3',4'-tetraisovaleroylaminodiphenyl ether; 2,2',3,3',4,4'-hexamalonoylamidodiphenyl ether; 2,2'-dipropyl-3,3',4,4'-tetraaryloylaminodiphenyl ether; 2,2',3,3'-tetranaphthyloylaminodiphenyl ether; and 3,3',4,4'-tetraterephthaloylaminodiphenyl ether.

*Example XIV*

The procedures of Examples I, II, V, VI and VIII, above, are carried out in that sequence, using appropriate reagents to produce the following polyammonium salt diphenyl ethers: 3,3',4,4'-tetraammoniumsulfatediphenyl ethers; 3,3',4,4'-tetraammoniumphosphatediphenyl ether; 3,3',4,4' - tetraammoniumhydrobromidediphenyl ether; 3,3',4,4' - tetraammoniumfluoboratediphenyl ether; 3,3'-4,4'-tetraammoniumhydroiodidediphenyl ether and 2,2-' dimethyl - 3,3',4,4' - tetraammoniumperchloratediphenyl ether.

Lower alkyl substituents, R, which can be attached to the annular carbon atoms of the aminodiphenyl ether compounds include, for example, methyl, ethyl, propyl, butyl, pentyl, hexyl, octyl, nonyl and other alkyl substituents containing up to 12 carbon atoms.

As will be understood by those skilled in the art, what has been described is the preferred embodiment of the invention. However, many modifications, changes, and substitutions can be made therein, without departing from the scope and the spirit of the following claims.

We claim:
1. An aminodiphenyl ether compound having the formula:

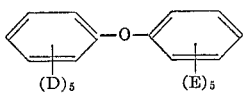

wherein
each D and each E substituent is independently selected from the group consisting of hydrogen, amino, ammonium salt, acyl amino and lower alkyl substituents; at least two of said D substituents and at least two of said E substituents being positioned on adjacent annular carbon atoms and selected from the group consisting of amino, ammonium salt, and acylamino substituents, said acyl substituent having the formula

wherein $R_1$ is selected from the group consisting of alkyl and aryl substituents.

2. An aminodiphenyl ether compound having the formula:

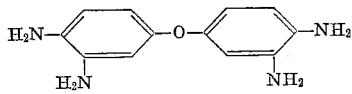

3. An aminodiphenyl ether compound having the formula:

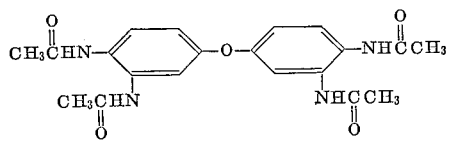

4. An aminodiphenyl ether compound having the formula:

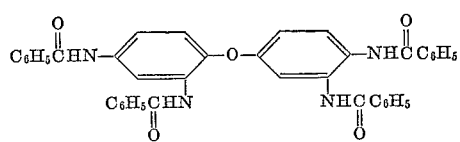

5. An aminodiphenyl ether compound having the formula:

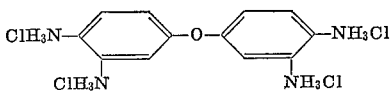

6. An aminodiphenyl ether compound having the formula:

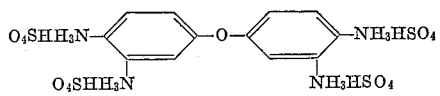

7. An aminodiphenyl ether compound having the formula:

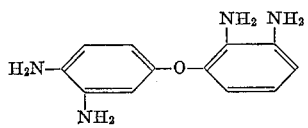

8. An aminodiphenyl ether compound having the formula:

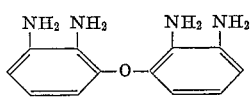

References Cited by the Examiner
UNITED STATES PATENTS
2,765,341  10/1956  Wirth et al. _____ 260—571

OTHER REFERENCES
Matsumura, Jour. Am. Chem. Soc., vol. 52, pp. 3199–3204 (1930).

WALTER A. MODANCE, *Primary Examiner.*

IRVING MARCUS, NICHOLAS S. RIZZO, *Examiners.*